US008600962B2

(12) United States Patent
Kamimura et al.

(10) Patent No.: US 8,600,962 B2
(45) Date of Patent: Dec. 3, 2013

(54) TRANSACTION PROCESSING DEVICE, TRANSACTION PROCESSING METHOD, AND TRANSACTION PROCESSING PROGRAM

(75) Inventors: Junpei Kamimura, Tokyo (JP); Atsushi Kitazawa, Tokyo (JP); Tomoo Ebiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/461,622

(22) Filed: May 1, 2012

(65) Prior Publication Data

US 2012/0290547 A1    Nov. 15, 2012

(30) Foreign Application Priority Data

May 10, 2011  (JP) ................................. 2011-105031

(51) Int. Cl.
*G06F 17/00*       (2006.01)
(52) U.S. Cl.
USPC .......................................................... 707/703
(58) Field of Classification Search
USPC .......................................... 707/703; 395/671
See application file for complete search history.

(56) References Cited

U.S. PATENT DOCUMENTS 5,701,480 A * 12/1997 Raz ................................. 718/101
6,374,264 B1 * 4/2002 Bohannon et al. .................. 1/1
2009/0106329 A1 * 4/2009 Masuda ......................... 707/202
2011/0004638 A1    1/2011 Nishiyama
2011/0208695 A1 * 8/2011 Anand et al. .................. 707/610
2012/0011106 A1 * 1/2012 Reid et al. ..................... 707/695
2012/0095974 A1 * 4/2012 Bentkofsky et al. .......... 707/703

FOREIGN PATENT DOCUMENTS

JP    2001-013923 A    1/2011
JP    2011-008451 A    1/2011

OTHER PUBLICATIONS

Sudipto Das, et al, "G-Store: A Scalable Data Store for Transactional Multi Key Access in the Cloud." In SoCC' 10, 2010.

* cited by examiner

*Primary Examiner* — Pierre Vital
*Assistant Examiner* — Courtney Harmon
(74) *Attorney, Agent, or Firm* — McGinn Intellectual Property Law Group, PLLC

(57) ABSTRACT

A transaction processing device including: a representative key decision portion for deciding a representative key to be any one of the keys of every record of a record group as an object for maintaining consistency in a transaction process; a log compilation portion for updating a subordinate log by adding consistence object information indicating the object for maintaining the consistency to the subordinate log other than a representative log corresponding to the representative key among the logs corresponding to every record of the record group; a log update portion for updating the representative log by writing update information for every record of the record group into the representative log; and a record update portion for updating every record by reflecting the update information written into the representative log in the every record of the record group.

17 Claims, 9 Drawing Sheets

TRANSACTION PROCESSING DEVICE, TRANSACTION PROCESSING METHOD, AND TRANSACTION PROCESSING PROGRAM

INCORPORATION BY REFERENCE

This application is based upon and claims the benefit of priority from Japanese patent application No. 2011-105031, filed on May 10, 2011, the disclosure of which is incorporated herein in its entirety by reference.

TECHNICAL FIELD

The present invention relates to transaction processing devices, transaction processing methods, and transaction processing programs.

BACKGROUND ART

In recent years, as a base or platform of carrying out scalable Web applications, attention is drawn to the so-called cloud utilizing a number of computers within a data center. As one of the infrastructures of such a cloud, Key-Value Store (to be referred to as "KVS" hereinafter) is known. KVS is a database for managing records composed of the pair of key and value. The following Patent Document 1 discloses a computer system having KVS. In this computer system, KVS is utilized as a cache device for caching data of databases in the server. The following Patent Document 2 discloses a database system having KVS. It is disclosed that this database system has a mechanism for combining data by introducing an attribute relationship between the data of KVS. The following Nonpatent Document 1 discloses a transaction processing system in which a management node is provided to manage the right of access to KVS.

[Patent Document 1] JP 2011-8451 A
[Patent Document 2] JP 2011-13923 A
[Nonpatent Document 1] Sudipto Das, Divyakant Agrawal and Amr El Abbadi. G-Store: A Scalable Data Store for Transactional Multi Key Access in the Cloud. In Socc' 10, 2010.

However, in KVS, atomicity is supported for data manipulation on a single record. Therefore, when carrying out a transaction process utilizing KVS, if atomicity is to be ensured, then because the transaction process is carried out according to each single record, processing efficiency will come down. Further, although the above-mentioned Nonpatent Document 1 discloses a method for managing the right of access to a plurality of record groups, with this method, however, not only a management node has to be further provided, but also it is necessary to carry out a process between the management node and other nodes to aggregate access rights into the management node as a preprocess before carrying out the transaction process. Thereby, the configuration becomes complicated.

SUMMARY

The present invention is configured to solve the above problem, and an exemplary object thereof is to provide a transaction processing device, a transaction processing method and a transaction processing program which are capable of carrying out a transaction process for a plurality of records with a simple configuration even in the case of carrying out the transaction process under the circumstances of managing records composed of the pair of key and value.

An aspect in accordance with the present invention provides a transaction processing device including:

a representative key decision portion for deciding a representative key to be any one of the keys of every record of a record group as an object for maintaining consistency in a transaction process;

a log compilation portion for updating a subordinate log by adding consistence object information indicating the object for maintaining the consistency to the subordinate log other than a representative log corresponding to the representative key among the logs corresponding to every record of the record group;

a log update portion for updating the representative log by writing update information for every record of the record group into the representative log; and a record update portion for updating every record by reflecting the update information written into the representative log in the every record of the record group.

Another aspect in accordance with the present invention provides a transaction processing method including:

deciding a representative key to be any one of the keys of every record of a record group as an object for maintaining consistency in a transaction process;

updating a subordinate log by adding consistence object information indicating the object for maintaining the consistency to the subordinate log other than a representative log corresponding to the representative key among the logs corresponding to every record of the record group;

updating the representative log by writing update information for every record of the record group into the representative log; and updating every record by reflecting the update information written into the representative log in the every record of the record group.

Still another aspect in accordance with the present invention provides a computer-readable medium storing a program comprising instructions for causing an information processing device to realize:

deciding a representative key to be any one of the keys of every record of a record group as an object for maintaining consistency in a transaction process;

updating a subordinate log by adding consistence object information indicating the object for maintaining the consistency to the subordinate log other than a representative log corresponding to the representative key among the logs corresponding to every record of the record group;

updating the representative log by writing update information for every record of the record group into the representative log; and updating every record by reflecting the update information written into the representative log in the every record of the record group.

According to the present invention, even in the case of carrying out a transaction process under the circumstances of managing records composed of the pair of key and value, it is still possible to carry out the transaction process for a plurality of records with a simple configuration.

EXEMPLARY EMBODIMENTS

Figure 1:
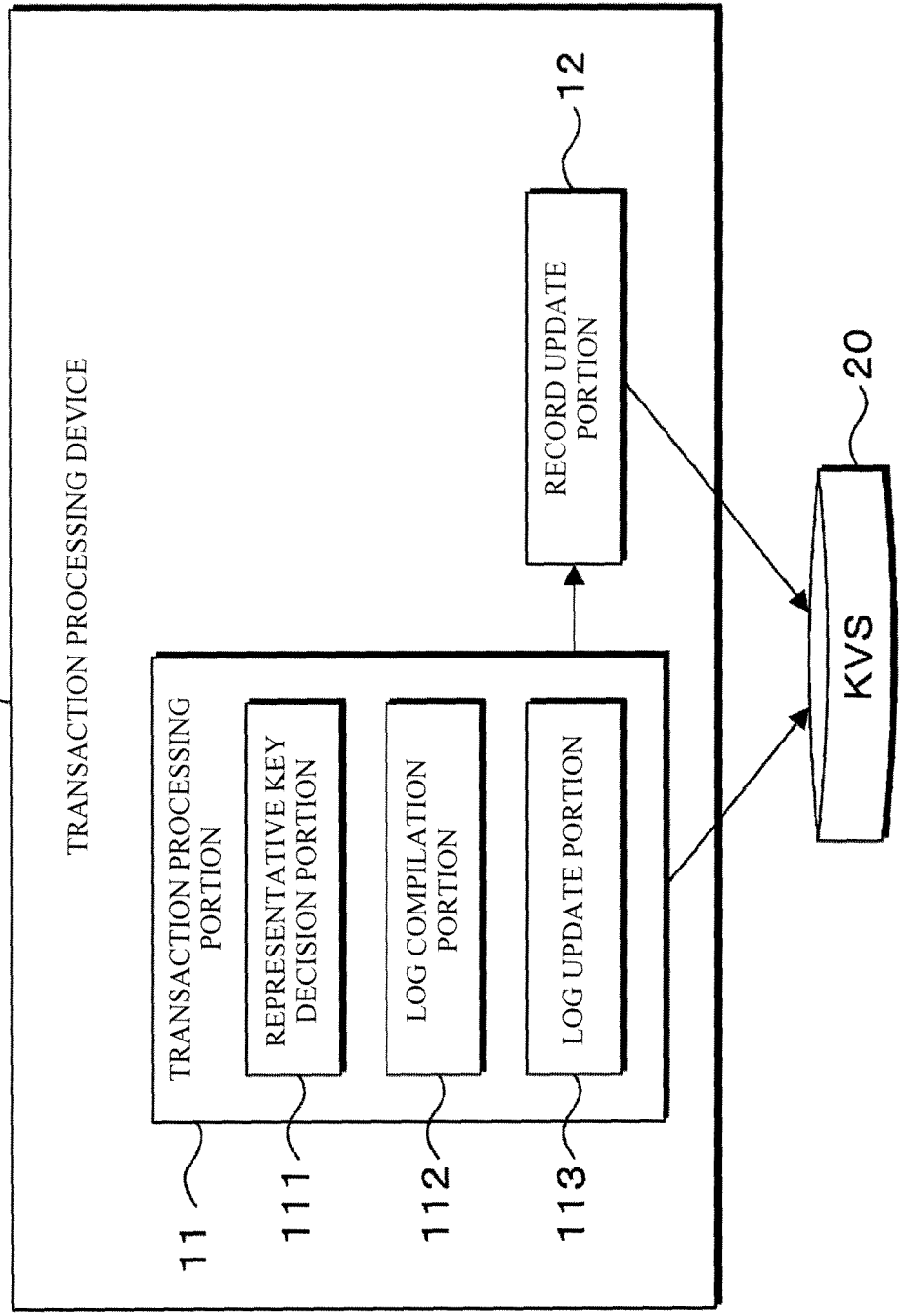
FIG. 1 is a diagram exemplifying a configuration of a transaction processing device in accordance with a first exemplary embodiment.

Hereinbelow, referring to the accompanying drawings, explanations will be made with respect to preferred exemplary embodiments of a transaction processing device, a transaction processing method, and a transaction processing program in accordance with the present invention.

Before describing the exemplary embodiments, WAL (Write Ahead Logging) will be explained. WAL is one of the transaction processing methods applied in ordinary relational database systems, writing out contents of change into logs (transaction logs) before changing data in the database. WAL has a characteristic of being carried out with ensured atomicity to write logs into a permanent storage device. By adopting such kind of WAL in transaction processing, it is possible to realize "A (Atomicity)" and "D (Durability)" among the transactional features of ACID (Atomicity Consistency Isolation Durability).

In transaction processes adopting WAL, two types of data are to be updated. One is the updating of logs, and the other is the updating of actual data. It is different in timing to write these two types of data into the permanent storage device. The log is written at the time of committing a transaction, while the actual data are written at the check point. By writing the actual data at the check point, it is possible to reduce the number of accesses to the low-speed hard disk commonly utilized as a permanent storage device.

The present invention enables the transaction processing for a plurality of records by adopting such kind of WAL under the circumstances of carrying out transaction processes utilizing KVS, and applying various mechanisms described hereinbelow. The following explanations will made with respect to a few exemplary embodiments of the present invention having such kind of characteristics.

[A First Exemplary Embodiment]

First, referring to FIG. 1, explanations will be made with respect to the functional configuration of a transaction processing device in accordance with a first exemplary embodiment. A transaction processing device 10 functionally has, for example, a transaction processing portion 11, and a record update portion 12. A KVS 20 is a database endowed with atomicity in manipulating a single record, and with CAS (Compare and Swap) command to the single record. The KVS 20 is constructed separately in a plurality of server devices to manage records composed of the pair of key and value.

The logs in the first exemplary embodiment are, in analogy with the actual records, composed of the pair of key and value. The logs maintain the latest contents of every record, and are stored in the KVS 20 separately from the actual records. For example, in the KVS 20, if (key, value)=(key 1, 10) is stored as a record while (key, value)=(WAL_key1, 20) is stored as the log corresponding to that record, then the latest content of "key1" is "20".

The key of a log, e.g. the identifier "WAL_" indicating a log of WAL, stores the data with the added attribute value of the key "key1" of the record corresponding to the log. The value of the log stores, for example, the value of the record corresponding to the log, and a "version". The "version" stores the value indicating the version of the present log. When a new log is created, the "version" stores "1". When a log is updated, the value stored in the "version" is incremented.

Further, if a log is an aftermentioned subordinate log, then the value of the log further stores in-process identification information which will be described hereinafter.

Although the KVS 20 is constructed separately in a plurality of server devices, the content of one log is not stored separately in the plurality of server devices but stored collectively in any one of the server devices. That is, the entire content of one log is stored collectively within a physically identical storage area.

In this connection, the transaction processing device 10 is configured to physically include, for example, a CPU (Central Processing Unit), a storage device, and an input and output interface. The storage device includes, for example, ROM (Read Only Memory) and HDD (Hard Disk Drive) for storing programs and data for the CPU to process, RAM (Random Access Memory) utilized mainly as various working areas for control processing, and the like. These components are connected to each other via a bus. The CPU executes the programs stored in the ROM to process the commands received through the input and output interface, and the data uploaded in the RAM. By virtue of this, it is possible to realize the function of each portion of the transaction processing device 10.

The transaction processing portion 11 shown in FIG. 1 carries out the process according to a processing request received from an application program. The processing request includes a query, for example. The transaction processing portion 11 includes a representative key decision portion 111, a log compilation portion 112, and a log update portion 113.

The representative key decision portion 111 decides the representative key selected from any one of the keys of every record of the record group as an object to maintain consistency in transaction processing. As a method for deciding the representative key, it is possible to adopt, for example, the method of deciding to take the first designated key as the representative key, the method of deciding to take the alphabetically foremost key as the representative key, the method of deciding to take a randomly selected key as the representative key, and the like.

The representative key decision portion 111 takes the log corresponding to the record of the representative key as the representative log. The representative key decision portion 111 takes the logs other than the representative log as the subordinate logs among the logs corresponding to every record of the aforementioned record group.

The log compilation portion 112 obtains the representative and subordinate logs from the KVS 20. The log compilation portion 112 adds in-process identification information for identifying a transaction as being processed to the subordinate logs obtained from the KVS 20, and utilizes a CAS command to update the subordinate logs of the KVS 20. Further, the information added to the subordinate logs is not limited to the in-process identification information, but may be any information (consistence object information) for identifying objects to maintain consistency.

Here, the update of logs by the CAS command can be carried out according to, for example, the following procedure.

First, when obtaining a log from the KVS 20, the "version" value of the log is temporarily stored. Next, when updating the log of the KVS 20, the "version" value of the log stored in the KVS 20 is compared with the above temporarily stored "version" value. Then, if the compared "version" values are the same, then the log of the KVS 20 is updated and the update of the log is regarded as successful. On the other hand, if the compared "version" values are different, then the log of the KVS 20 is not updated and the update of the log is regarded as unsuccessful.

By utilizing the CAS command to update logs, for the following reasons, it is possible to maintain the coherency of log data. First, when the compared "version" values are the same, this means that other transactions have not updated the log of the KVS 20. Therefore, in this case, if the log of the KVS 20 is updated, the coherency of the data is still maintained. On the other hand, when the compared "version" values are different, this means that other transactions have updated the log of the KVS 20 during the period of processing the relevant transaction. Therefore, in this case, the coherency of the data is maintained by ceasing to update the log of the KVS 20.

If the log to be obtained from the KVS 20 does not exist, then the log compilation portion 112 carries out the process as follows.

First, the log compilation portion 112 obtains a record of the transactional object from the KVS 20 with the "get" command. Next, it creates a log in the KVS 20 with the "create" command. Then, it stores a duplicate of the above-obtained record into the above-created log with the "set" command or the CAS command. Further, the timing of creating the log in the KVS 20 can be set arbitrarily. For example, when creating a record in the KVS 20, the log of the record may as well be created in the KVS 20. For creating a log in the KVS 20, it is possible to utilize the "set" command or the CAS command.

The log update portion 113 updates the data (the value of each record) included in the representative and subordinate logs obtained from the KVS 20 according to the query, and writes the updated contents into the representative log. The log update portion 113 updates the representative log of the KVS 20 with the updated content written into the representative log. The CAS command is utilized for updating the representative log of the KVS 20.

After the transaction processing is finished, the record update portion 12 obtains the representative log from the KVS 20 and, based on the update information written in the representative log, updates each record of the KVS 20 included in the record group. The record update portion 12 updates the content of each log of the KVS 20 by rewriting the same with the content of each of the latest records after the updating. The CAS command is utilized for the updating through rewriting each log of the KVS 20. By the updating through rewriting each log, it is possible to delete the in-process identification information from each log.

Further, the method for deleting the in-process identification information from each log is not limited to updating the log of the KVS 20 with the CAS command, but may utilize the "delete" command, for example, to delete the log from the KVS 20. Further, the update process by the record update portion 12 can be carried out at an arbitrary time after the transaction is finished.

Next, referring to FIGS. 2 and 3, explanations will be made with respect to an operation of the transaction processing device 10 in accordance with the first exemplary embodiment. In this operation example, explanations will be made for the case that the application program requests for consistency of the Record 1 and the Record 2. Further, the logs corresponding to the Record 1 and Record 2 are denoted as the log 1 and log 2, respectively. The keys of the Record 1 and Record 2 are denoted as the key 1 and key 2, respectively.

Figure 2:
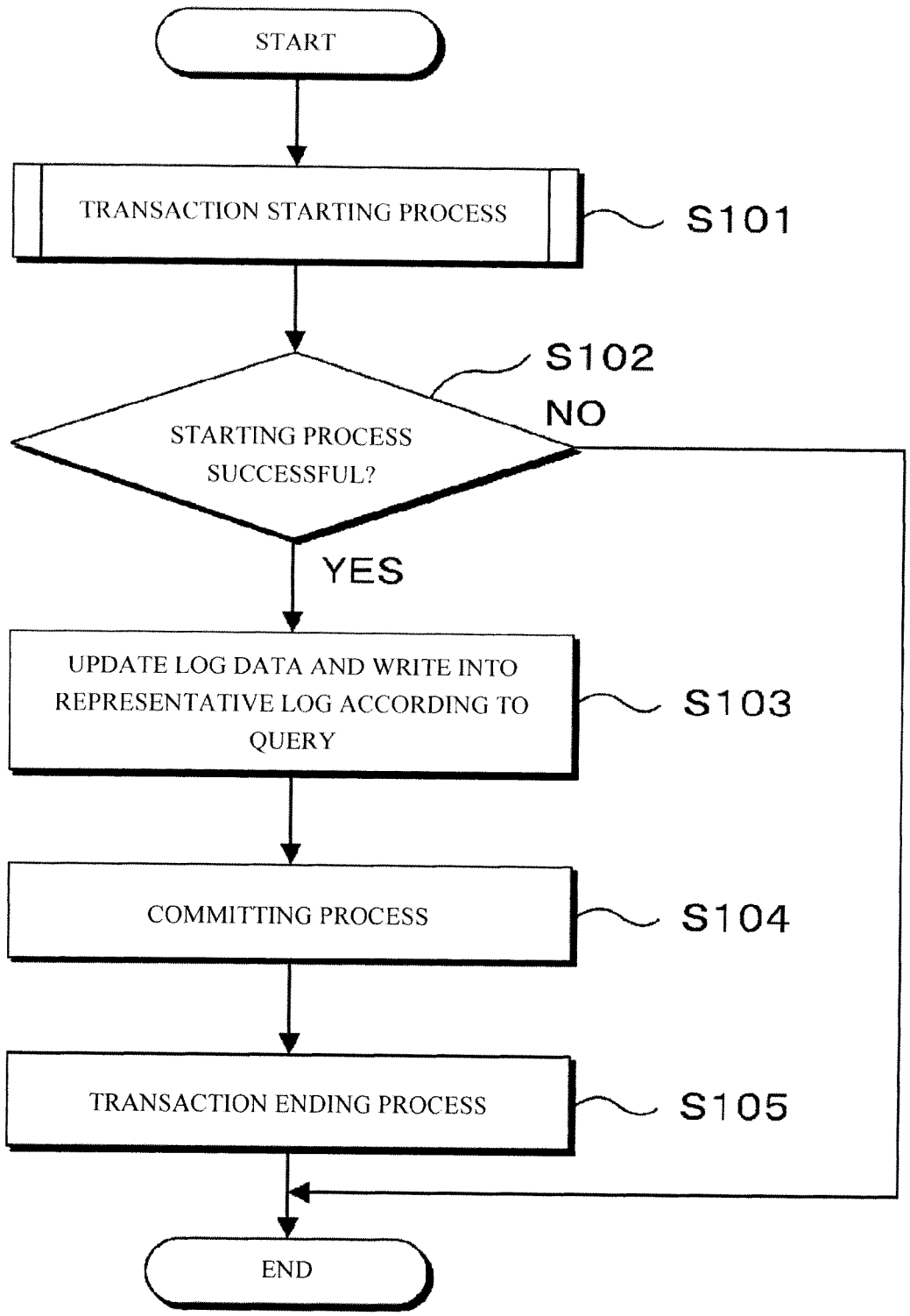
FIG. 2 is a flowchart for explaining an operation of the transaction processing device in accordance with the first exemplary embodiment.

First, when the application program sends the "begin" command to the transaction processing portion 11 (the step S201 in FIG. 3), the transaction processing portion 11 carries out a transaction starting process (the step S101 in FIG. 2).

Here, referring to FIG. 4 (as well as to FIG. 3 as appropriate), explanations will be made in detail with respect to the content of the transaction starting process carried out in the above step S101.

Figure 4:
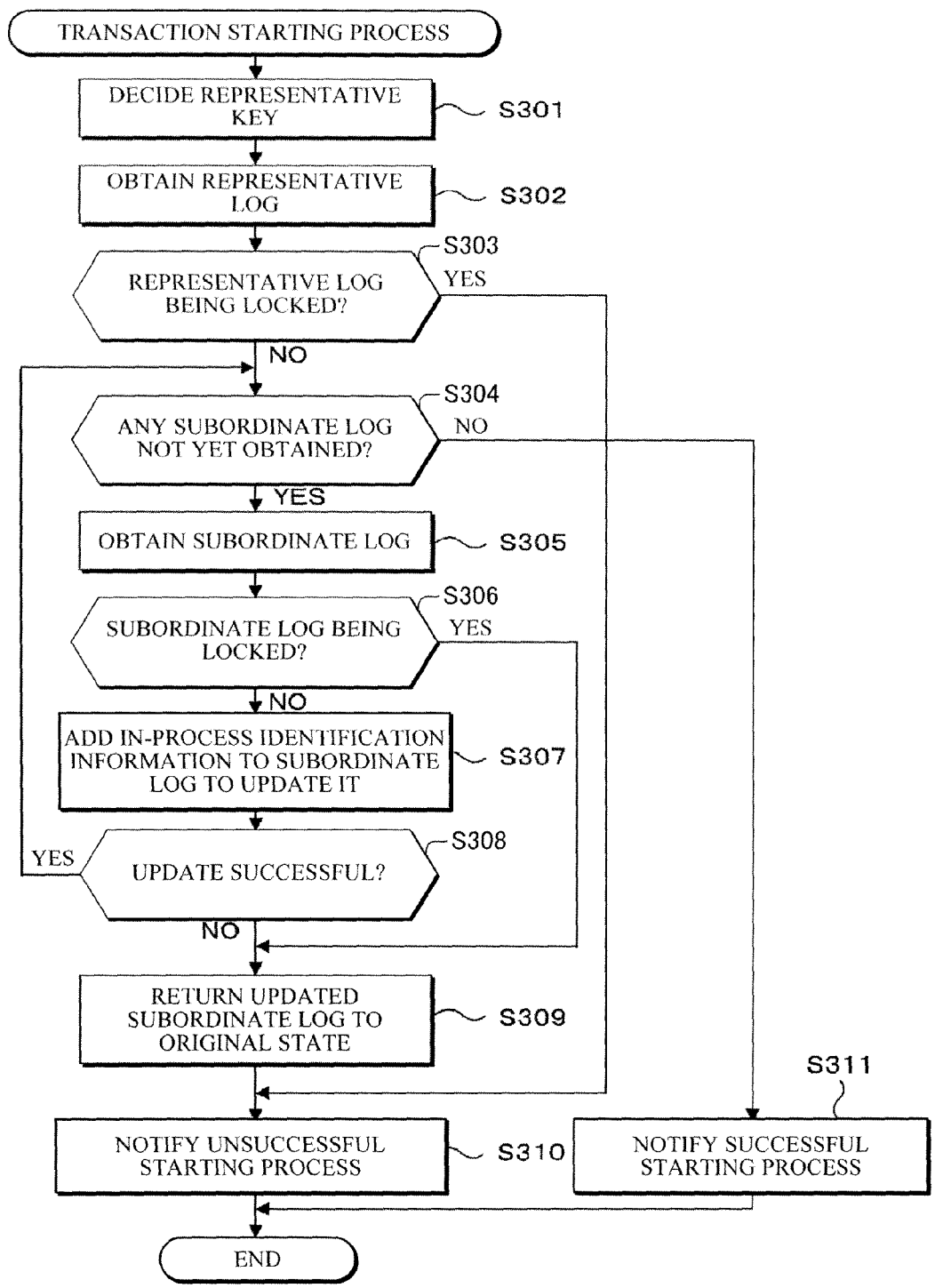
FIG. 4 is a flowchart for explaining a procedure of a transaction starting process in accordance with the first exemplary embodiment.

First, the representative key decision portion 111 of the transaction processing portion 11 decides the representative key selected from the keys of every record in the record group as an object to maintain consistency in transaction processing (the step S301 in FIG. 4). Here, it is supposed to have decided to take the key 1 as the representative key.

Next, the log compilation portion 112 of the transaction processing portion 11 sends the "get" command to the KVS 20 for obtaining the representative log (the step S202 in FIG. 3), and obtains the representative log 1 from the KVS 20 (the step S302 in FIG. 4).

Then the log compilation portion 112 of the transaction processing portion 11 determines whether or not the obtained representative log to be in a locked state (the step S303 in FIG. 4). Whether or not a log is in a locked state is determined by whether or not the in-process identification information is written into the log. That is, a log is determined to be in a locked state if the in-process identification information is written therein, whereas it is determined to be not in a locked state if the in-process identification information is not written therein. The case of the in-process identification information having been written in the representative log corresponds to that the representative log has already become a subordinate log of another record group, etc.

If the representative log is determined to be in a locked state in the above step (S303: Yes), then the transaction processing portion 11 notifies of an unsuccessful transaction starting process (the step S310 in FIG. 4), and ends the transaction starting process. Further, in this case, it may as well not end the transaction starting process but stand by for a predetermined time and then transfer the process to the step S302 to restart the process from the step of obtaining the representative log from the KVS 20.

On the other hand, if the representative log is determined to be not in a locked state in the above step (S303: No), then the log compilation portion 112 of the transaction processing portion 11 determines whether or not there are any subordinate logs not yet obtained (the step S304 in FIG. 4). If this determination is No (the step S304: No), then the transaction processing portion 11 notifies of a successful transaction starting process (the step S311 in FIG. 4), and ends the transaction starting process.

On the other hand, if it is determined that there is a subordinate log not yet obtained in the above step (S304: Yes), then the log compilation portion 112 of the transaction processing portion 11 sends the "get" command to the KVS 20 for obtaining the subordinate log (the step S203 in FIG. 3) to obtain the subordinate log 2 from the KVS 20 (the step S305 in FIG. 4).

Then, the log compilation portion 112 of the transaction processing portion 11 determines whether or not the obtained subordinate log to be in a locked state (the step S306 in FIG. 4). If this determination is Yes (the step S306: Yes), then the process transfers over to the aftermentioned step S309.

On the other hand, if the obtained subordinate log is determined to be not in a locked state in the above step (S306: No), then the log compilation portion 112 of the transaction processing portion 11 adds the in-process identification information to the obtained subordinate log, and updates the subordinate log of the KVS 20 with the CAS command (the step S307 in FIG. 4 and the step S204 in FIG. 3).

Then, the log compilation portion 112 of transaction processing portion 11 determines whether or not the update in the above step S307 to be successful (the step S308 in FIG. 4). If this determination is Yes (the step S308: Yes), then the process transfers back to the step S304.

On the other hand, if the update is determined to be unsuccessful in the above step (S308: No), then the log compilation portion 112 of the transaction processing portion 11 returns the subordinate log to its original state if it was already updated in the step S307 (the step S309 in FIG. 4), and notifies of an unsuccessful transaction starting process (the step S310 in FIG. 4). Then, the transaction starting process is ended.

Figure 3:
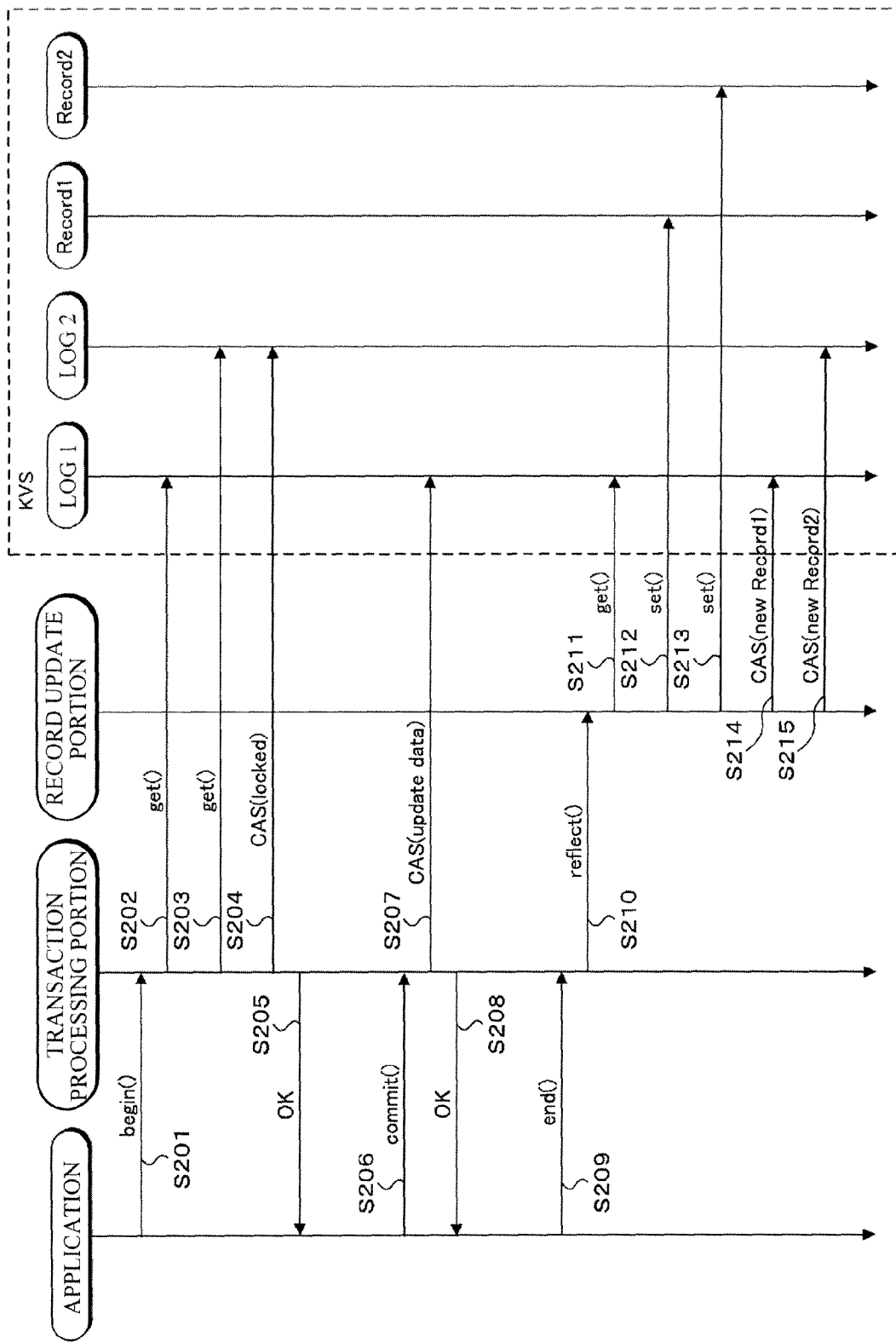
FIG. 3 is a sequence chart for explaining the operation of the transaction processing device in accordance with the first exemplary embodiment.

Now the explanation will return from FIG. 4 to FIGS. 2 and 3. After the transaction starting process in the step S101 in FIG. 2 in finished, the application program determines whether or not the transaction starting process to be successful (the step S102 in FIG. 2). If this determination is No (the step S102: No), then the present operation is ended.

On the other hand, if the transaction starting process is determined to be successful in the above step (S102: Yes), then the log update portion 113 of the transaction processing portion 11 updates the data included in each log obtained from the KVS 20 according to the query, and writes the updated contents into the representative log (the step S103 in FIG. 2).

Next, the application program and the transaction processing portion 11 carry out a committing process (the step S104 in FIG. 2). The committing process is carried out, for example, according to the following procedure (see FIG. 3).

First, in order to finalize the update, the application program sends the "commit" command to the transaction processing portion 11 (the step S206 in FIG. 3). Next, the log update portion 113 of the transaction processing portion 11 updates the representative log 1 of the KVS 20 with the CAS command (the step S207 in FIG. 3). If the CAS command is successful, then the log update portion 113 of the transaction processing portion 11 sends a reply message indicating a successful update to the application program (the step S208 in FIG. 3).

Further, if the CAS command is unsuccessful, then this means that the log 1 has been rewritten by another transaction. Therefore, the log update portion 113 of the transaction processing portion 11 sends a reply massage indicating an unsuccessful update to the application program.

Now the explanation will return to FIG. 2. Following the committing process in the above step S104, the application program and the transaction processing portion 11 carry out a transaction ending process (the step S105 in FIG. 2) to end the present operation. The transaction ending process is carried out, for example, according to the following procedure (see FIG. 3).

First, in order to end the transaction process, the application program sends the "end" command to the transaction processing portion 11 (the step S209 in FIG. 3). Next, in order to reflect the content of the representative log in each record, the transaction processing portion 11 sends the "reflect" command to the record update portion 12 (the step S210 in FIG. 3). Then, the record update portion 12 sends the "get" command to the KVS 20 (the step S211 in FIG. 3) to obtain the log 1 from the KVS 20.

Then, the record update portion 12 sends the "set" command to the KVS 20 (the step S12 in FIG. 3) to update the Record 1, and sends the "set" command to the KVS 20 (the step S213 in FIG. 3) to update the Record 2. Then, the record update portion 12 updates the log 1 of the KVS 20 with the CAS command to rewrite the log 1 with the content of the updated Record 1 (the step S214 in FIG. 3). Then, the record update portion 12 updates the log 2 of the KVS 20 with the CAS command to rewrite the log 2 with the content of the updated Record 2 (the step S215 in FIG. 3).

As described hereinabove, according to the transaction processing device 10 in the first exemplary embodiment, it is possible to decide the representative key selected from the keys of every record of the object record group to maintain consistency in transaction processing, and it is also possible to utilize the CAS command to add the in-process identification information to the subordinate logs other than the representative log corresponding to the representative key. By virtue of this, it is possible to restrict the access of other transactions to the subordinate logs.

Further, according to the transaction processing device 10 in the first exemplary embodiment, it is possible to utilize the CAS command to write the update information for every record of the record group into the representative log of the KVS 20, and it is also possible to utilize the CAS command to further write the update information written into the representative log into each record of the record group in the KVS 20. By virtue of this, because it is possible to manage with the single representative log to reflect in each record the update information for every record of the record group, it becomes possible to update data while maintaining consistency as it is for a plurality of records.

Because of the above reason, according to the transaction processing device 10 in the first exemplary embodiment, even in the case of utilizing the KVS to carry out a transaction process, it is still possible to carry out the transaction process for a plurality of records with a simple configuration.

[A Modification of the First Exemplary Embodiment]

Further, although the above-mentioned transaction processing device 10 in the first exemplary embodiment adds the in-process identification information to the subordinate logs to exclude other transaction processes (pessimistic concurrency control), it does not add the in-process identification information to the representative log so as not to exclude other transaction processes (optimistic concurrency control). Therefore, there is a possibility for the CAS command of the step S207 in FIG. 3 to be unsuccessful. Hence, the in-process identification information may be added to the representative log as well to exclude other transaction processes.

Figure 5:
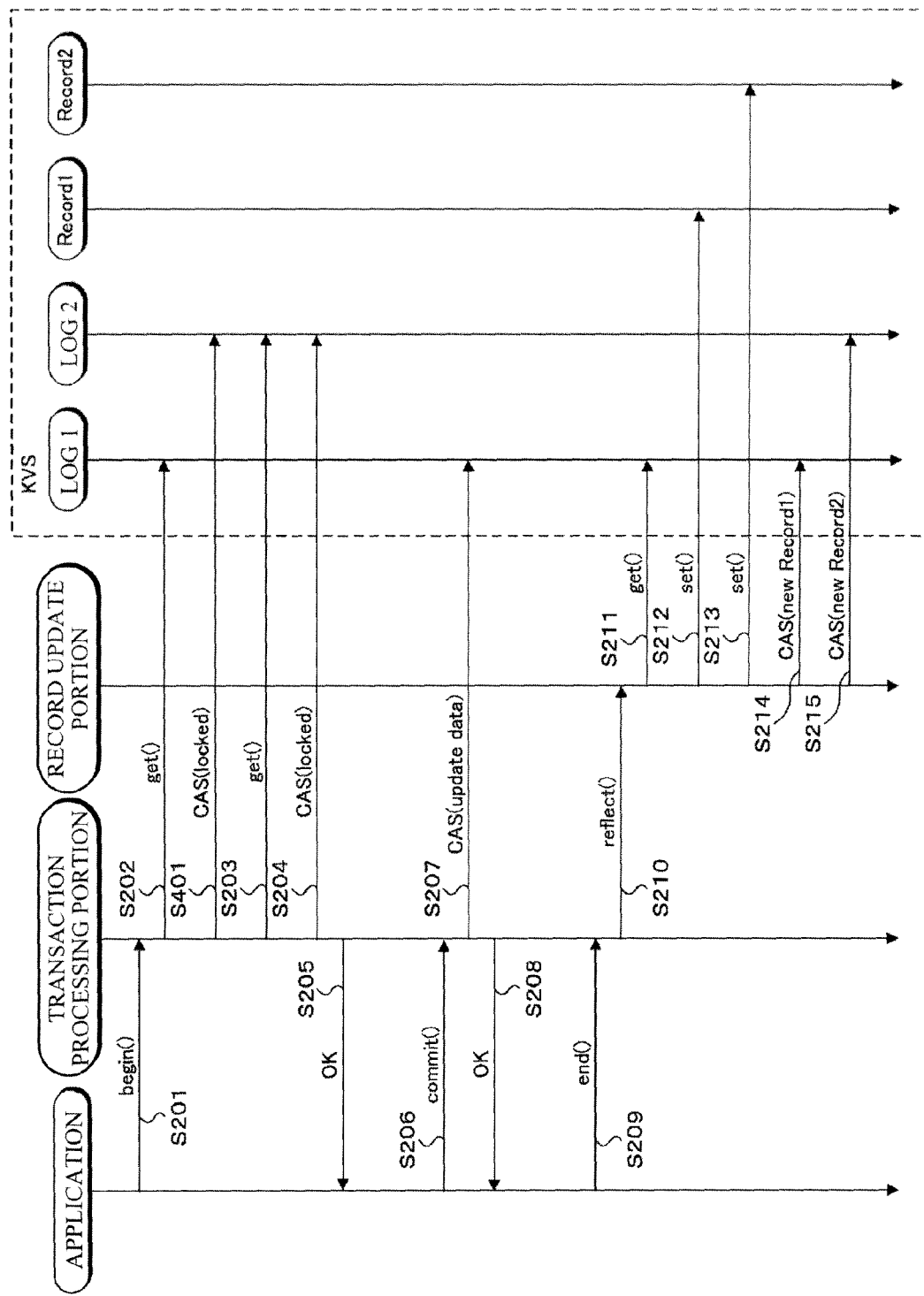
FIG. 5 is a sequence chart for explaining an operation of a transaction processing device in accordance with a modification.
Figure 6:
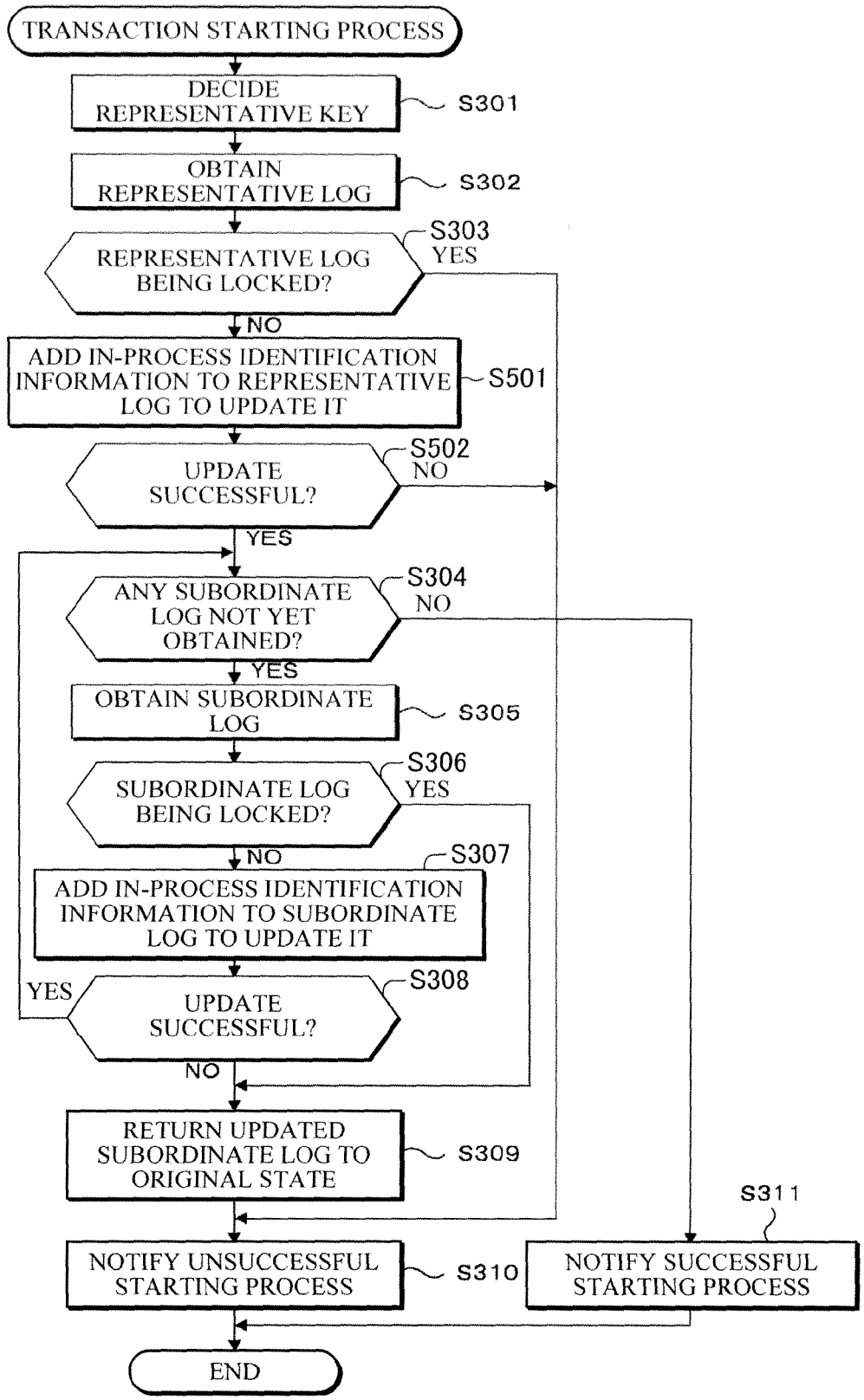
FIG. 6 is a flowchart for explaining a procedure of a transaction starting process in accordance with the modification.

Referring to FIGS. 5 and 6, explanations will be made with respect to the operation of a transaction processing device 10 in accordance with the above modification. FIG. 5 is a sequence chart corresponding to the aforementioned FIG. 3. FIG. 5 is different from FIG. 3 in the aspect of adding a step S401 between the step S202 and the step S203 in FIG. 3. FIG. 6 is a flowchart corresponding to the aforementioned FIG. 4. FIG. 6 is different from FIG. 4 in the aspect of adding steps S501 and S502 between the step S303 and the step S304 in FIG. 4. The following explanations will be made for those different aspects compared with the first exemplary embodiment.

In the transaction starting process shown in FIG. 6, if the representative log is determined to be not in a locked state in the step (S303: No), then the log compilation portion 112 of the transaction processing portion 11 adds the in-process identification information to the obtained representative log, and updates the representative log of the KVS 20 with the CAS command (the step S501 in FIG. 6 and the step S401 in FIG. 5).

Then, the log compilation portion 112 of transaction processing portion 11 determines whether or not the update in the above step S501 to be successful (the step S502 in FIG. 6). If this determination is Yes (the step S502: Yes), then the process transfers to the aforementioned step S304.

On the other hand, if the update is determined to be unsuccessful in the above step (S502: No), then the log compilation portion 112 of the transaction processing portion 11 notifies of an unsuccessful transaction starting process (the step S310 in FIG. 6). Then, the transaction starting process is ended.

According to this modification it is possible to utilize the CAS command to add the in-process identification information to the representative log as well for identifying an in-process transaction. By virtue of this, it becomes possible to restrict the accesses of other transactions to the representative and subordinate logs.

[A Second Exemplary Embodiment]

Now, a second exemplary embodiment will be explained. The configuration of a transaction processing device 10 in accordance with the second exemplary embodiment is the same as that of the transaction processing device 10 in accordance with the first exemplary embodiment shown in FIG. 1. The aforementioned transaction processing device 10 of the first exemplary embodiment adds the in-process identification information to the subordinate logs of transactions in processing, and adopts a pessimistic concurrency control to exclude other transaction processes. In contrast to this, the transaction processing device 10 in accordance with the second exemplary embodiment is different from the transaction processing device 10 in accordance with the first exemplary embodiment in the aspect of adopting an optimistic concurrency control.

In particular, the second exemplary embodiment adopts an optimistic concurrency control which adds representative key identification information to the subordinate logs of transaction in processing for identifying the representative key so as to allow other transactions to continue the process following the logs; thus, the result of the transactions finishing the committing process earlier is reflected in the KVS 20, whereby the transactions carrying out the committing process later are subject to failing. Along with this, there are also differences partially in the functions of the representative key decision portion 111 the log compilation portion 112 and the log update portion 113 included in the transaction processing portion 11. The following explanations will be focused on the different aspects compared with the first exemplary embodiment.

Figure 7:
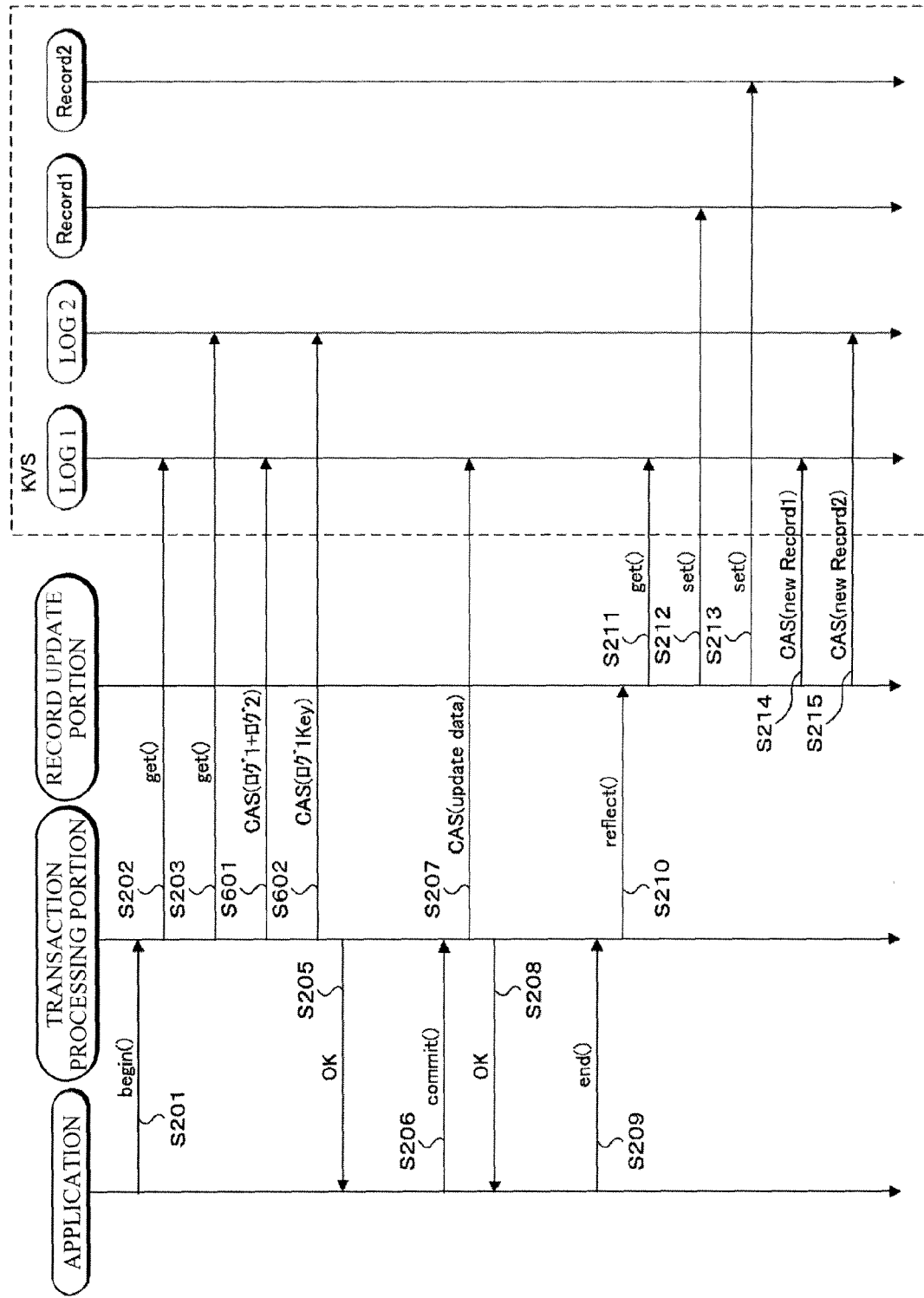
FIG. 7 is a sequence chart for explaining an operation of a transaction processing device in accordance with a second exemplary embodiment.

Referring to FIGS. 2 and 7, explanations will be made with respect to an operation of the transaction processing device 10 in accordance with the second exemplary embodiment. In this operation example, in analogy with the aforementioned operation example in the first exemplary embodiment, the explanations will be made for the case that the application program requests for consistency of the Record 1 and the Record 2. Further, the logs corresponding to the Record 1 and Record 2 are denoted as the log 1 and log 2, respectively. The keys of the Record 1 and Record 2 are denoted as the key 1 and key 2, respectively.

FIG. 7 is a sequence chart corresponding to the aforementioned FIG. 3 in the first exemplary embodiment. FIG. 7 is different from FIG. 3 in the aspect of replacing the step S204 of FIG. 3 by the steps S601 and S602. In the transaction processing device 10 of the second exemplary embodiment, among every process shown in FIG. 2, the content of the transaction starting process in the step S101 is different from that of the aforementioned transaction processing device 10 of the first exemplary embodiment. Therefore, referring to FIGS. 8 and 9, the following explanations will be made for the transaction starting process of the second exemplary embodiment.

Figure 8:
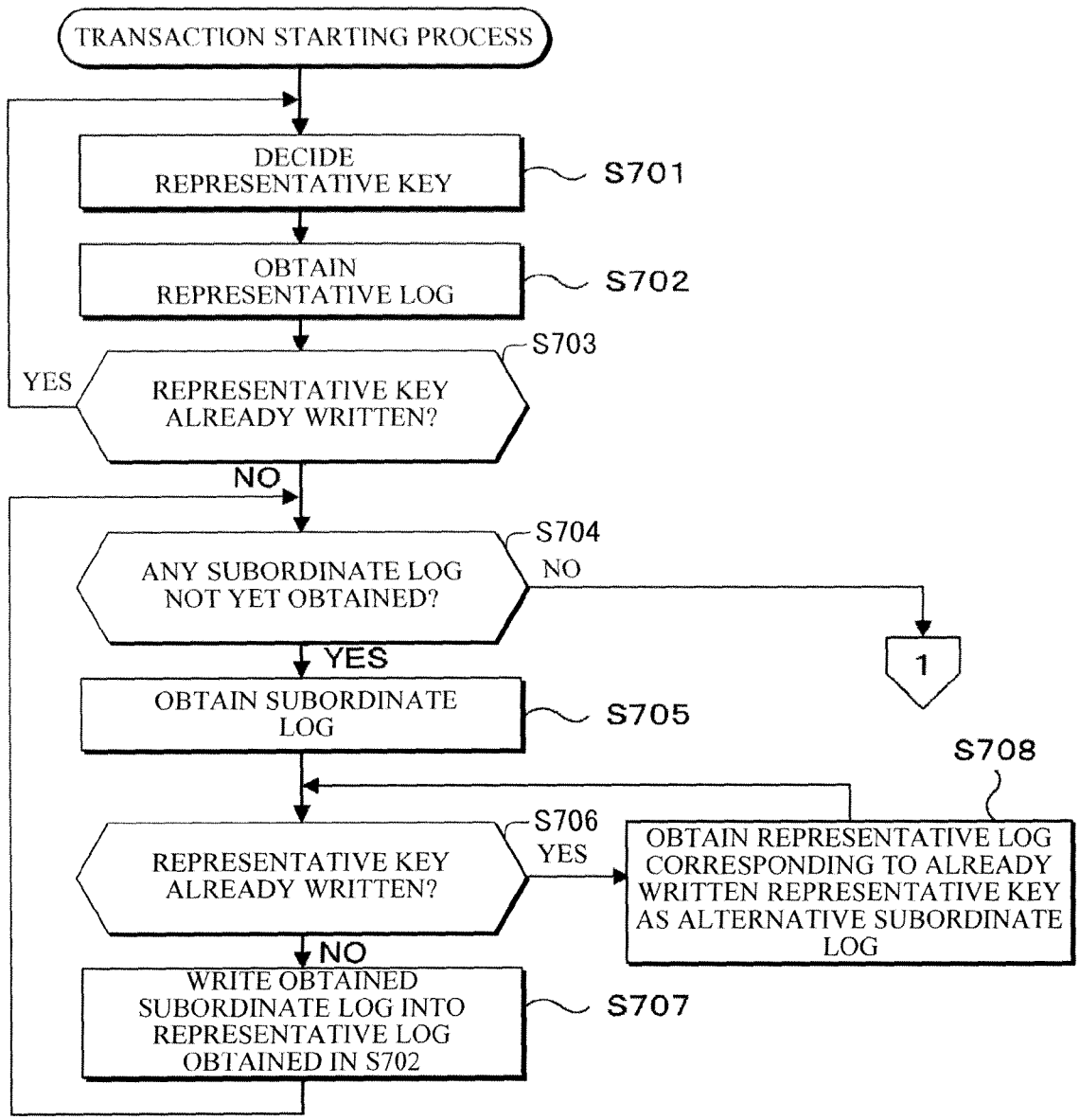
FIG. 8 is a flowchart for explaining a procedure of a transaction starting process in accordance with the second exemplary embodiment.

First, the representative key decision portion 111 of the transaction processing portion 11 decides the representative key selected from the keys of every record in the record group as an object to maintain consistency in transaction processing (the step S701 in FIG. 8). Here, it is supposed to have decided to take the key 1 as the representative key.

Next, the log compilation portion 112 of the transaction processing portion 11 sends the "get" command to the KVS 20 for obtaining the representative log (the step S202 in FIG. 7), and obtains the representative log 1 from the KVS 20 (the step S702 in FIG. 8).

Then, the log compilation portion 112 of the transaction processing portion 11 determines whether or not the representative key identification information is already written in the obtained representative log (the step S703 in FIG. 8). The case of the representative key identification information having been written in the representative log corresponds to that the representative log has already become a subordinate log of another record group, etc.

If the representative key identification information is determined to be written in the representative log in the above step (S703: Yes), then the process transfers back to the above step S701. Then, the representative key decision portion 111 of the transaction processing portion 11 redecides to take the representative key corresponding to the written representative key identification information as the new representative key. The process following this representative key is repeated during the representative key identification information being written in the obtained representative log. By virtue of this, it is possible to appoint the uppermost representative key as the representative key.

On the other hand, if the representative key identification information is determined to be not written in the representative log in the above step (S703: No), then the log compilation portion 112 of the transaction processing portion 11 determines whether or not there is any subordinate log not yet obtained (the step S704 in FIG. 8). If this determination is Yes (the step S704: Yes), then the log compilation portion 112 of the transaction processing portion 11 sends the "get" command to the KVS 20 for obtaining the subordinate log (the step S203 in FIG. 7) to obtain the subordinate log 2 from the KVS 20 (the step S705 in FIG. 8).

Then, the log compilation portion 112 of the transaction processing portion 11 determines whether or not the representative key identification information is already written in the obtained subordinate log (the step S706 in FIG. 8). The case of the representative key identification information having been written in the subordinate log corresponds to that the subordinate log has already become a subordinate log of another record group, etc.

If the representative key identification information is determined to be written in the subordinate log in the above step (S706: Yes), then the log compilation portion 112 of the transaction processing portion 11 obtains from the KVS 20 (the step S708 in FIG. 8) the representative log corresponding to the written representative key identification information as the subordinate log replacing that obtained in the above step S705 (or in the previous step S708). Then, the process transfers back to the above step S706.

On the other hand, if the representative key identification information is determined to be not written in the subordinate log in the above step (S706: No), then the log compilation portion 112 of the transaction processing portion 11 adds and writes the content of the subordinate log obtained in the above step S705 or the step S708 to the representative log obtained in the above step S702 (the step S707). Then, the process transfers back to the above step S704.

On the other hand, if it is determined that there is no subordinate log not yet obtained (the step S704: No), then the log compilation portion 112 of the transaction processing portion 11 updates the representative log of the KVS 20 with the CAS command (the step S709 in FIG. 9 and the step S601 in FIG. 7).

Figure 9:
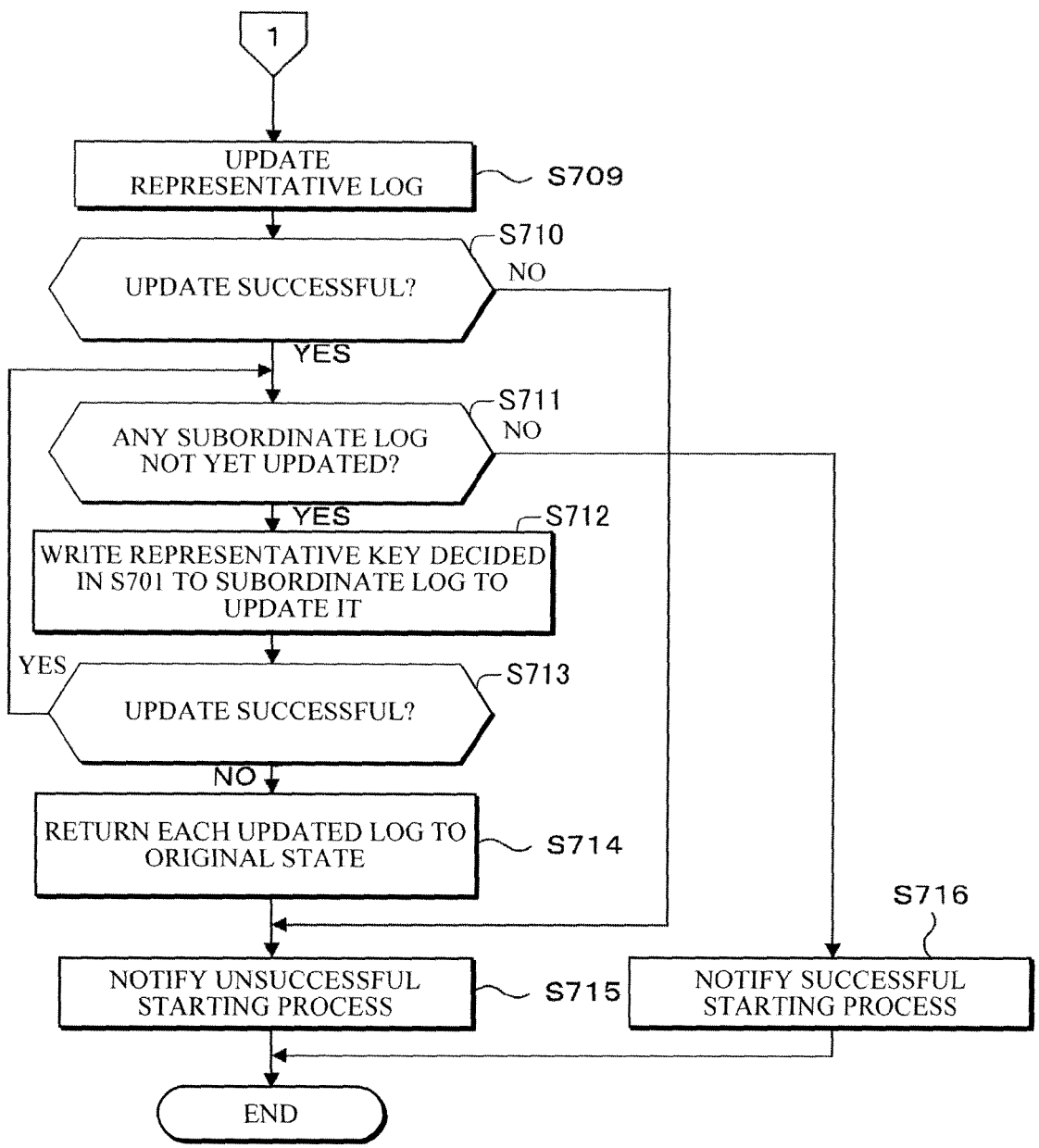
FIG. 9 is another flowchart for explaining the procedure of the transaction starting process in accordance with the second exemplary embodiment.

Then, the log compilation portion 112 of transaction processing portion 11 determines whether or not the update in the above step S709 to be successful (the step S710 in FIG. 9). If this determination is No (the step S710: No), then the transaction processing portion 11 notifies of an unsuccessful transaction starting process (the step S715 in FIG. 9), and ends the transaction starting process.

On the other hand, if the update is determined to be successful in the above step (S710: Yes), then the log compilation portion 112 of the transaction processing portion 11 determines whether or not there are any subordinate logs not yet obtained (the step S711 in FIG. 9). If this determination is No (the step S711: No), then the transaction processing portion 11 notifies of a successful transaction starting process (the step S716 in FIG. 9), and ends the transaction starting process.

On the other hand, if it is determined that there is a subordinate log not yet obtained in the above step (S711: Yes), then the log compilation portion 112 of the transaction processing portion 11 adds the representative key identification information of the representative key decided in the above step S701 to the subordinate log obtained in the above step S705 or the step S708, and updates the subordinate log of the KVS 20 with the CAS command (the step S712 in FIG. 9 and the step S602 in FIG. 7).

Then, the log compilation portion 112 of transaction processing portion 11 determines whether or not the update in the above step S712 to be successful (the step S713 in FIG. 9). If this determination is Yes (the step S713: Yes), then the process transfers back to the aforementioned step S711.

On the other hand, if the update is determined to be unsuccessful in the above step (S713: No), then the log compilation portion 112 of the transaction processing portion 11 returns the updated log to its original state if it was already updated (the step S714 in FIG. 9), and notifies of an unsuccessful transaction starting process (the step S715 in FIG. 9). Then, the transaction starting process is ended.

As described hereinabove, according to the transaction processing device 10 in the second exemplary embodiment, it is possible to decide the representative key from the keys of every record of the object record group to maintain consistency in transaction processing, and it is also possible to utilize the CAS command to add the representative key identification information to the subordinate logs other than the representative log corresponding to the representative key. By virtue of this, it is possible to restrict the access of other transactions to the subordinate logs.

Further, according to the transaction processing device 10 in the second exemplary embodiment, it is possible to utilize the CAS command to add and write the content of a subordinate log to the representative log of the KVS 20, and it is also possible to utilize the CAS command to further write the update information written into the representative log into each record of the record group in the KVS 20. By virtue of this, because it is possible to manage with the single representative log to reflect in each record the update information for every record of the record group, it becomes possible to update data while maintaining consistency as it is for a plurality of records.

Further, according to the transaction processing device 10 in the second exemplary embodiment, when the representative log with the decided representative key has already been set as a subordinate log of another record group, by following the representative key identification information already written in the log, it becomes possible to search for the uppermost log to decide to take the key corresponding to that log as the representative key.

Further, according to the transaction processing device 10 in the second exemplary embodiment, when a subordinate log has already been set as a subordinate log of another record group, by following the representative key identification information already written in the log, it becomes possible to search for a log corresponding to the uppermost subordinate log to write and add the content of that log to the representative log.

Because of the above reason, according to the transaction processing device 10 in the second exemplary embodiment, even in the case of utilizing the KVS to carry out a transaction process, it is still possible to carry out the transaction process for a plurality of records with a simple configuration.

Further, each of the exemplary embodiments described hereinabove is merely exemplification and thus by no means excludes any applications of various modifications and techniques unspecified in those exemplary embodiments. That is, it is possible to embody the present invention through modifications in diverse forms without departing from the true spirit and scope thereof.

For example, the whole or part of each of the exemplary embodiments disclosed above may also be described as the following supplementary notes, but the present invention is not limited thereto.

(Supplementary Note 1)

A transaction processing device comprising:

a representative key decision portion for deciding a representative key to be any one of the keys of every record of a record group as an object for maintaining consistency in a transaction process;

a log compilation portion for updating a subordinate log by adding consistence object information for identifying the object for maintaining the consistency to the subordinate log other than a representative log corresponding to the representative key among the logs corresponding to every record of the record group;

a log update portion for updating the representative log by writing update information for every record of the record group into the representative log; and a record update portion for updating every record by reflecting the update information written into the representative log in the every record of the record group.

(Supplementary Note 2)

The transaction processing device according to Supplementary Note 1, wherein the consistence object information is in-process identification information for identifying a transaction in process; and the log compilation portion updates the representative log by adding the in-process identification information to the representative log.

(Supplementary Note 3)

The transaction processing device according to Supplementary Note 1, wherein the consistence object information is representative key identification information for identifying the representative key; and the log update portion updates the representative log by adding the content of the subordinate log to the representative log if the representative key has been decided by the representative key decision portion.

(Supplementary Note 4)

The transaction processing device according to Supplementary Note 3, wherein the representative key decision portion redecides the representative key to be a key identified by the representative key identification information in the case that the representative key identification information has already been added to the decided representative log.

(Supplementary Note 5)

The transaction processing device according to Supplementary Note 3 or 4, wherein in the case that the representative key identification information has already been added to the subordinate log, the log update portion updates the representative log by adding the content of the log corresponding to the representative key identification information as the content of the subordinate log to the representative log.

(Supplementary Note 6)

The transaction processing device according to any of Supplementary Notes 1 to 5, wherein the logs and the records are stored in a KVS (Key-Value Store) composed physically of a plurality of storage areas.

(Supplementary Note 7)

The transaction processing device according to Supplementary Note 6, wherein the log compilation portion, the log update portion, and the record update portion utilize a CAS (Compare And Swap) command to update the logs of the KVS.

(Supplementary Note 8)

A transaction processing method comprising:

a representative key decision step for deciding a representative key to be any one of the keys of every record of a record group as an object for maintaining consistency in a transaction process;

a log compilation step for updating a subordinate log by adding consistence object information for identifying the object for maintaining the consistency to the subordinate log other than a representative log corresponding to the representative key among the logs corresponding to every record of the record group;

a log update step for updating the representative log by writing update information for every record of the record group into the representative log; and a record update step for updating every record by reflecting the update information written into the representative log in the every record of the record group.

(Supplementary Note 9)

A transaction processing computer program comprising instructions for causing a computer to implement each of the steps according to Supplementary Note 8.

The invention claimed is:

1. A representative key decision portion for deciding a representative key to be anyone of keys of every record of a record group as an object for maintaining consistency in a transaction process; a log compilation portion for updating a subordinate log by adding consistence object information indicating the object for maintaining the consistency to the subordinate log other than a representative log corresponding to the representative key among logs corresponding to every record of the record group; a log update portion for updating the representative log by writing update information for every record of the record group into the representative log; and a record update portion for updating every record by reflecting the update information written into the representative log in the every record of the record group, wherein the consistence object information comprises in-process identification information for identifying a transaction in process, and wherein the transaction processing device is configured to carry out ceasing the transaction process if the consistence object information has already been added to the logs corresponding to the every record of the record group; wherein the logs and the records are stored in a KVS (Key-Value Store) physically comprising a plurality of storage areas; wherein the log compilation portion, the log update portion, and the record update portion utilize a CAS (Compare And Swap) command to update the logs of the KVS.

2. The transaction processing device according to claim 1, wherein the log compilation portion is configured to update the representative log by adding the in-process identification information to the representative log.

3. The transaction processing device according to claim 1, wherein the log update portion is configured to update the representative log by adding a content of the subordinate log to the representative log if the representative key has been decided by the representative key decision portion.

4. The transaction processing device according to claim 3, wherein the consistence object information comprises representative key identification information for identifying the representative key, and wherein the representative key decision portion is configured to redecide the representative key to be a key identified by the representative key identification information in a case that the representative key identification information has already been added to the decided representative log.

5. The transaction processing device according to claim 4, wherein in a case that the representative key identification information has already been added to the subordinate log, the log update portion is configured to update the representative log by adding a content of the log corresponding to the representative key identification information as the content of the subordinate log to the representative log.

6. The transaction processing device according to claim 1, wherein, among the logs corresponding to said every record of the record group as the object for said maintaining consistency in the transaction process, in the representative log, the updated information is stored such that said every record is updated.

7. The transaction processing device according to claims 6, wherein the consistence object information is stored in the subordinate log other than the representative log.

8. The transaction processing device according to claim 1, wherein the consistence object information is stored in the subordinate log other than the representative log among the logs corresponding to said every record of the record group.

9. A transaction processing method~ comprising: deciding a representative key to be anyone of keys of every record of a record group as an object for maintaining consistency in a transaction process; updating a subordinate log by adding consistence object information indicating the object for maintaining the consistency to the subordinate log other than a representative log corresponding to the representative key among logs corresponding to every record of the record group; updating the representative log by writing update information for every record of the record group into the representative log; updating every record by reflecting the update information written into the representative log in the every record of the record group, wherein the consistence object information comprises in-process identification information for identifying a transaction in process: and ceasing the transaction process if the consistence object information has already been added to the logs corresponding to the every record of the record group; wherein the logs and the records are stored in a KVS (Key-Value Store) physically comprising a plurality of storage areas; wherein the log compilation portion, the log update portion, and the record update portion utilize a CAS (Compare And Swap) command to update the logs of the KVS.

10. The method according to claim 9, wherein, among the logs corresponding to said every record of the record group as the object for said maintaining consistency in the transaction process, in the representative log, the update information is stored such that said every record is updated.

11. The method according to claim 9, wherein the consistence object information is stored in the subordinate log other than the representative log among the logs corresponding to said every record of the record group.

12. A non-transitory computer-readable medium storing a program comprising instructions for causing an information processing device to realize: deciding a representative key to be anyone of keys of every record of a record group as an object for maintaining consistency in a transaction process; updating a subordinate log by adding consistence object information indicating the object for maintaining the consistency to the subordinate log other than a representative log corresponding to the representative key among logs corresponding to every record of the record group; updating the representative log by writing update information for every record of the record group into the representative log; updating every record by reflecting the update information written into the representative log in the every record of the record group, wherein the consistence object information comprises in-process identification information for identifying a transaction in process: and ceasing the transaction process if the consistence object information has already been added to the logs corresponding to the every record of the record group; wherein the logs and the records are stored in a KVS (Key-Value Store) physically comprising a plurality of storage areas; wherein the log compilation portion, the log update portion, and the record update portion utilize a CAS (Compare And Swap) command to update the logs of the KVS.

13. The non-transitory computer-readable medium according to claim 12, wherein, among the logs corresponding to said every record of the record group as the object for said maintaining consistency in the transaction process, in the representative log, the update information is stored such that said every record is updated.

14. The non-transitory computer-readable medium according to claim 12, wherein the consistence object information is stored in the subordinate log other than the representative log among the logs corresponding to said every record of the record group.

15. A transaction processing device comprising: representative key decision means for deciding a representative key to be any one of keys of every record of a record group as an object for maintaining consistency in a transaction process; log compilation means for updating a subordinate log by adding consistence object information indicating the object for maintaining the consistency to the subordinate log other than a representative log corresponding to the representative key among logs corresponding to every record of the record group; log update means for updating the representative log by writing update information for every record of the record group into the representative log; and record update means for updating every record by reflecting the update information written into the representative log in the every record of the record group, wherein the consistence object information comprises in-process identification information for identifying a transaction in process: and ceasing the transaction process if the consistence object information has already been added to the logs corresponding to the every record of the record group; wherein the logs and the records are stored in a KVS (Key-Value Store) physically comprising a plurality of storage areas; wherein the log compilation portion, the log update portion, and the record update portion utilize a CAS (Compare And Swap) command to update the logs of the KVS.

16. The transaction processing device according to claim 15, wherein, among the logs corresponding to said every record of the record group as the object for said maintaining consistency in the transaction process, in the representative log, the update information is stored such that said every record is updated.

17. The transaction processing device according to claim 15, wherein the consistence object information is stored in the subordinate log other than the representative log among the logs corresponding to said every record of the record group.

* * * * *